US010015510B1

(12) United States Patent
Navarrete Michelini et al.

(10) Patent No.: US 10,015,510 B1
(45) Date of Patent: Jul. 3, 2018

(54) IMAGE COMPRESSION SYSTEM, DECOMPRESSION SYSTEM, TRAINING METHOD AND DEVICE, AND DISPLAY DEVICE

(71) Applicant: BOE TECHNOLOGY GROUP CO., LTD., Beijing (CN)

(72) Inventors: Pablo Navarrete Michelini, Beijing (CN); Lijie Zhang, Beijing (CN); Xiaoyu Li, Beijing (CN); Jianmin He, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 18 days.

(21) Appl. No.: 15/501,422

(22) PCT Filed: May 20, 2016

(86) PCT No.: PCT/CN2016/082766
§ 371 (c)(1),
(2) Date: Feb. 2, 2017

(87) PCT Pub. No.: WO2017/152499
PCT Pub. Date: Sep. 14, 2017

(30) Foreign Application Priority Data

Mar. 7, 2016 (CN) .......................... 2016 1 0127676

(51) Int. Cl.
*G06K 9/62* (2006.01)
*H04N 19/50* (2014.01)
(Continued)

(52) U.S. Cl.
CPC .............. *H04N 19/50* (2014.11); *G06N 3/08* (2013.01); *H04N 19/117* (2014.11); *H04N 19/42* (2014.11)

(58) Field of Classification Search
CPC ............ H04N 19/00; H04M 1/00; H04B 1/00
(Continued)

(56) References Cited

U.S. PATENT DOCUMENTS 6,154,572 A * 11/2000 Chaddha ............. H03M 7/3082
375/E7.049
6,707,948 B1 * 3/2004 Cosman ............... H04N 19/647
375/E7.027
(Continued)

FOREIGN PATENT DOCUMENTS

CN         1922859 A       2/2007
CN       102148988 A       8/2011
(Continued)

OTHER PUBLICATIONS

International Search Report with English language translation, dated Aug. 31, 2016, PCT Application No. PCT/CN2016/082766.
(Continued)

*Primary Examiner* — Abolfazl Tabatabai
(74) *Attorney, Agent, or Firm* — Womble Bond Dickinson (US) LLP

(57) ABSTRACT

The disclosure relates to an image compression system, an image decompression system, a training method and device, as well as a display device. In the image compression system, convolutional neural network modules are used to complete the update and prediction processes. As such, the weight of each filtering unit in the convolutional neural network module can be trained in order to provide the corresponding image compression system with a better compression rate, thereby reducing the difficulty in setting the filtering parameters of the image compression unit and the image decompression unit.

6 Claims, 2 Drawing Sheets

(51) Int. Cl.
*G06N 3/08* (2006.01)
*H04N 19/42* (2014.01)
*H04N 19/117* (2014.01)
*G01L 1/00* (2006.01)

(58) Field of Classification Search
USPC ........................................................ 382/157
See application file for complete search history.

(56) References Cited

U.S. PATENT DOCUMENTS

| | | |
|---|---|---|
| 2004/0213472 A1 | 10/2004 | Kodama et al. |
| 2006/0008164 A1 | 1/2006 | Wu et al. |
| 2007/0183675 A1 | 8/2007 | Morohashi |

FOREIGN PATENT DOCUMENTS

| | | |
|---|---|---|
| CN | 104198184 A | 12/2014 |
| CN | 104424900 A | 3/2015 |
| CN | 105120130 A | 12/2015 |
| CN | 205408063 U | 7/2016 |
| WO | 2007/129436 A1 | 11/2007 |

OTHER PUBLICATIONS

Navarrete, P., et al., "System and Methods for Image Super-resolution Using Deep Convolutional Networks". pp. 1-13.

Sweldens, W., "The Lifting Scheme: A Construction of Second Generation Wavelets," Siam J. Math. Anal, vol. 29, No. 2 (1997). pp. 1-42.

Claypoole, R., et al., "Nonlinear Wavelet Transforms for Image Coding via Lifting," IEEE Trans. on Image Processing, vol. 12, No. 12, Dec 2003. pp. 1-6.

Yi, Z., "Adaptive Lifting Scheme via BP Neural Networks," Apr. 2010. pp. 1-49.

Gao, G., "Theory of Second Generation Wavelet Transforms and Its Application in the Signal and Image Coding Algorithms," May 2004. pp. 1-112.

Office Action received for Chinese Patent Application No. 201610127676.6, dated Feb. 6, 2018, 20 pages (11 pages of English Translation and 9 pages of Office Action).

* cited by examiner

IMAGE COMPRESSION SYSTEM, DECOMPRESSION SYSTEM, TRAINING METHOD AND DEVICE, AND DISPLAY DEVICE

TECHNICAL FIELD

The present disclosure relates to the field of display technology, and more particularly to an image compression system, a decompression system, a training method and device, as well as a display device.

BACKGROUND ART

Wavelet transform is a way of multi-resolution image transform which is often used for image compression. Applications of wavelet transform include transform coding in JPEG2000 standard. The objective of wavelet transform is to represent an original full image by a part of the full image, and the original image can be obtained by utilizing a low-resolution image (a part of the original image) and some discrepant features required for restoration of the original full image. A lifting scheme is an effective implementation of wavelet transform and a flexible tool for constructing wavelets. FIG. 1 shows a typical structure for encoding and decoding original images by means of 1D data. The left side thereof corresponds to an encoder, and the right side thereof corresponds to a decoder. The encoder compresses an image by using a prediction filter p and an update filter u to obtain a low-resolution image A and details D. During the compression application, the desired value of D is about 0 such that most information can be contained in the image A. During the decompression, the same update filter u and predication filter p are used but arranged in a reverse order. It is easy to prove that such an arrangement renders output equal to input, with no requirement on the filters p and u. Generally speaking, filtering parameters in each filtering unit of such filters p and u are manually set, and the weight set in such a manner can hardly enable the corresponding encoder to obtain an optimal or approximately optimal compression rate, and the manual setting procedure is very complicated and error-prone.

SUMMARY

To solve or alleviate at least one aforementioned defect in the prior art, it is desired in the art to reduce the difficulty in setting filtering parameters of an image compression unit and an image decompression unit.

According to one aspect of the present invention, there is provided an image compression system, characterized in that the image compression system comprises:

a first image input terminal for receiving a first image and a plurality of second image input terminals for receiving a plurality of second images;

a first convolutional neural network module configured to respectively predict each of the second images to obtain a plurality of predicted images corresponding to the plurality of second images in a one-to-one relationship;

an image discrepancy acquisition module configured to determine the discrepant features between each of the second images and the corresponding predicted images, and take the discrepant features as a discrepant feature set;

a second convolutional neural network module configured to determine updated features corresponding to the first images in a one-to-one relationship;

an image superposition module configured to superpose the updated feature with the corresponding first image to obtain a superposed image; and an output terminal configured to output the superposed image obtained by the image superposition module and the discrepant feature set determined by the image discrepancy acquisition module as a compressed image;

wherein the first convolutional neural network module is configured to predict each of the second images respectively according to the first image so as to obtain the plurality of predicted images corresponding to the plurality of second images in a one-to-one relationship, and the second convolutional neural network module updates the discrepant feature set to obtain the updated features; or the second convolutional neural network module updates the plurality of second images to obtain the updated features, and the first convolutional neural network module is configured to predict the plurality of second images respectively according to the superposed image so as to obtain the plurality of predicted images corresponding to the plurality of second images in a one-to-one relationship.

In an embodiment, the image compression system comprises a first image input terminal configured to receive a first image.

In an embodiment, the image compression system further comprises a splitting unit configured to receive an original image and split the original image, so as to obtain the first image and the plurality of second images and provide the same respectively to the first image input terminal and the plurality of second image input terminals.

In an embodiment, the splitting unit is configured to split the original image into 2n images, wherein n is a positive integer larger than 0, the number of the first image is 1, and the number of the second images is 2n−1.

In an embodiment, the first image and the plurality of second images comprise a plurality of consecutive images received from an image sequence.

According to another aspect of the present invention, there is provided an image compression system, characterized in that the image compression system comprises multiple stages of image compression units and an output interface, each stage of the image compression unit comprises:

a first image input terminal for receiving a first image and a second image input terminal for receiving a second image;

a first convolutional neural network module configured to respectively predict each of the second image to obtain a predicted image corresponding to the second image in a one-to-one relationship;

an image discrepancy acquisition module configured to determine the discrepant features between each of the second image and the corresponding predicted image, and take the determined discrepant features as a discrepant feature set;

a second convolutional neural network module configured to determine updated features corresponding to the first image in a one-to-one relationship; and an image superposition module configured to superpose the updated feature with the corresponding first image to obtain a superposed image;

wherein the first convolutional neural network module is configured to predict each of the second image respectively according to the first image so as to obtain the predicted image corresponding to the second image in a one-to-one relationship, and the second convolutional neural network module updates the discrepant feature set to obtain the updated features; or the second convolutional neural network module updates the second image to obtain the updated features, and the first convolutional neural network module is configured to predict each of the second image respectively according to the superposed image so as to obtain the predicted image corresponding to the second image in a one-to-one relationship, in any two adjacent stages of image compression units, the previous stage of the image compression unit has a plurality of first image input terminals, and the image superposition units thereof are connected to the first image input terminal and second image input terminal of the next stage of the image compression unit and are used to input a part of the plurality of superposed images as the first images into the connected first image input terminals of the next stage of the image compression unit in a one-to-one relationship, and input the other part of the superposed images as the second images into the connected second image input terminals of the next stage of the image compression unit in a one-to-one relationship, and the output interface is configured to output the superposed images obtained by the final stage of the image compression unit and the discrepant feature set obtained by each stage of the image compression unit as a compressed image.

In an embodiment, the image compression system comprises two stages of image compression units, the number of the first image input terminals of the first stage image compression unit is 2, the number of the second image input terminals thereof is 2; and the number of the first image input terminal of the second stage image compression unit is 1 and the number of the second image input terminal is 1.

In an embodiment, the image compression system further comprises a splitting unit connected to the first image input terminals and the second image input terminals of the first stage image compression unit and configured to receive an original image and split the original image, so as to obtain the plurality of first images and the plurality of second images and output the plurality of first images to the connected first image input terminals in a one-to-one relationship and the plurality of second images to the connected second image input terminals in a one-to-one relationship.

In an embodiment, the splitting unit is configured to split the original image into 2n images, wherein n is a positive integer larger than 1, the number of the first images is n, and the number of the second images is n.

In an embodiment, the first image input terminals and the second image input terminals of the first stage image compression unit receive consecutive images from the image sequence as the first images and the second images.

According to another aspect of the present invention, there is provided an image decompression system, characterized in that the image decompression system comprises:

a superposed image input terminal configured to receive a superposed image;

a discrepant feature input terminal configured to receive a discrepant feature set comprising a plurality of discrepant features;

a second convolutional neural network module configured to determine updated features corresponding to the superposed image in a one-to-one relationship;

an image desuperposition module configured to desuperpose the updated features from the corresponding superposed image provided by the superposed image input terminal to obtain a first image;

a first convolutional neural network module configured to predict a plurality of second images;

a de-discrepancy module configured to obtain predicted images of the plurality of second images and the discrepant feature set, and obtain the corresponding second image according to the predicted image of each of the second images and the corresponding discrepant feature of the second image; and an output terminal configured to output the first image and the plurality of second images;

wherein the second convolutional neural network module is configured to update the discrepant feature set provided by the discrepant feature input terminal so as to determine the updated feature, and the first convolutional neural network module is configured to predict the plurality of second images according to the first image, or the first convolutional neural network module is configured to predict the plurality of second images according to the superposed image, and the second convolutional neural network module is configured to update the plurality of second images to determine the updated features.

In an embodiment, the image decompression system comprises a superposed image input terminal configured to receive a superposed image.

In an embodiment, the image decompression system further comprises a splicing unit configured to splice the first image and the plurality of second images outputted from the output terminal into one image as a decompressed image.

According to another aspect of the present invention, there is provided an image decompression system, characterized in that the image decompression system comprises an input interface, multiple stages of image decompression units and an output interface, the input interface is configured to receive a compressed image comprising a superposed image and a discrepant feature set containing a plurality of discrepant features, wherein the plurality of discrepant features are respectively the discrepant features between each of the plurality of second images and a corresponding predicted image, each stage of the image decompression unit comprises:

a superposed image input terminal configured to receive a superposed image;

a discrepant feature input terminal configured to receive the discrepant features;

a second convolutional neural network module configured to determine the updated features corresponding to the received superposed images in a one-to-one relationship;

an image desuperposition module configured to desuperpose the updated features from the corresponding superposed image provided by the superposed image input terminal to obtain a first image;

a first convolutional neural network module configured to predict each of the second images;

a de-discrepancy module configured to obtain the predicted image of each of the second images and the discrepant feature set received by the discrepant feature input terminal, and obtain the second image according to the predicted image of each of the second images and the corresponding discrepant feature of the second image; and an output terminal configured to output the first image and the second images;

wherein the second convolutional neural network module is configured to update the discrepant feature set provided by the discrepant feature input terminal so as to determine the updated feature, and the first convolutional neural network module is configured to predict each of the second images according to the first image, or the first convolutional neural network module is configured to predict each of the second images according to the superposed image, and the second convolutional neural network module is configured to update the second images to determine the updated features, the superposed image input terminal and the discrepant feature input terminal of the first stage image decompression unit respectively receive the superposed image and the corresponding discrepant features directly from the input interface, in any two adjacent stages of image decompression units, the superposed image input terminal of the next stage of the image decompression unit is connected to the output terminal of the previous stage of the image decompression unit so as to receive the superposed image therefrom, and the discrepant feature input terminal of the next stage of the image decompression unit receives the corresponding discrepant feature directly from the input interface, the output interface is connected to the output terminal of the final stage of the image decompression unit and configured to output the first image and the second image provided by the final stage of the image decompression unit.

In an embodiment, the image decompression system further comprises a slicing unit connected to the output terminal of the final stage of the image decompression unit and the output interface for slicing the first image and the second image outputted from the output terminal into one image and outputting the same to the output interface.

According to another aspect of the present invention, there is provided a method for training any image compression system as stated above, characterized by comprising the steps of:

inputting a pre-set image as an image to be compressed into the image compression system, and respectively adjusting the weight of each filtering unit in each convolutional layer of the first convolutional neural network module and the second convolutional neural network module until the value of the following cost function L is the minimum:

$$L = \sum_{m=1}^{M} \|Dm\|_p + \|A - LR\|_q$$

wherein Dm is the m-th discrepant feature in a discrepant feature set, M is the number of the discrepant features in the discrepant feature set; A is a superposed image finally outputted from the image compression system; LR is a low-resolution image corresponding to the pre-set image; and p and q are natural numbers;

wherein $$\|X\|_1 = \sqrt{\sum_{n=0}^{N} x(n)} \; ; \|X\|_2 = \sqrt{\sum_{n=0}^{N} x^2(n)} \; ;$$

x(n) is the n-th element in X, and N is the total number of the elements in X.

In an embodiment, before the step of adjusting the weight of each filtering unit in each convolutional layer of the first convolutional neural network module, the method further comprises the step of:

initializing the weight of each filtering unit of the first convolutional neural network module according to the following formula:

$$W_{ij} = \begin{cases} \frac{1}{(NF)}; & \text{if } (i, j) \text{ is a preset anchor pixel} \\ 0; & \text{otherwise} \end{cases},$$

wherein NF indicates the number of input features;

or initializing the weight of each filtering unit of the first convolutional neural network module according to the following formula:

$$W_{ij} = \frac{1}{NF \cdot W \cdot H}$$

wherein $W_{ij}$ is the weight corresponding to the filter whose input unit is the i-th input unit and whose output unit is the j-th output unit; NF is the number of input features, W is the height of the corresponding filtering unit, and H is the width of the corresponding filtering unit.

In an embodiment, before the step of adjusting the weight of each filtering unit in each convolutional layer of the first convolutional neural network module, the method further comprises the step of:

superposing an interference value $$\frac{\text{uniform}(-1, 1)}{\sqrt{NF}}$$

with the weight of each filtering unit of the first convolutional neural network module in the initialization system, wherein uniform (−1,1) indicates a random number selected between (−1, 1);

initializing the bias of each filtering unit to be 0.

According to another aspect of the present invention, there is provided a device for training any image compression system as stated above, characterized by comprising:

an adjusting module for inputting a pre-set image as an image to be compressed into the image compression system, and adjusting the weight of each filtering unit in each convolutional layer of a first convolutional neural network module and a second convolutional neural network module to make the value of the following cost function L minimum:

$$L = \sum_{m=1}^{M} \|Dm\|_p + \|A - LR\|_q$$

wherein Dm is the m-th discrepant feature in a discrepant feature set, M is the number of the discrepant features in the discrepant feature set; A is a superposed image finally outputted from the image compression system; LR is a low-resolution image corresponding to the pre-set image; and p and q are natural numbers;

wherein $$\|X\|_1 = \sqrt{\sum_{n=0}^{N} x(n)} \; ; \|X\|_2 = \sqrt{\sum_{n=0}^{N} x^2(n)} \; ;$$

x(n) is the n-th element in X, and N is the total number of the elements in X.

In an embodiment, the device further comprises: a first initialization module or a second initialization module;

the first initialization module is configured to initialize the weight of each filtering unit of a first convolutional neural network module according to the following formula before the adjusting module adjusts the weight of each filtering unit in each convolutional layer of the first convolutional neural network module:

$$W_{ij} = \begin{cases} \frac{1}{(NF)}; & \text{if } (i, j) \text{ is a preset anchor pixel} \\ 0; & \text{otherwise} \end{cases},$$

wherein NF indicates the number of input features;

the second initialization module is configured to initialize the weight of each filtering unit of the first convolutional neural network module according to the following formula before the adjusting module adjusts the weight of each filtering unit in each convolutional layer of the first convolutional neural network module:

$$W_{ij} = \frac{1}{NF \cdot W \cdot H}$$

wherein $W_{ij}$ is the weight corresponding to the filter whose input unit is the i-th input unit and whose output unit is the j-th output unit; NF is the number of input features, W is the height of the corresponding filtering unit, and H is the width of the corresponding filtering unit.

In an embodiment, the device further comprises a third initialization module that is configured to superpose an interference value $$\frac{\text{uniform}(-1, 1)}{\sqrt{NF}}$$

with the weight of each filtering unit of the first convolutional neural network module in the initialization system before the adjusting module adjusts the weight of each filtering unit in each convolutional layer of the first convolutional neural network module, wherein uniform (−1,1) indicates a random number selected between (−1, 1);

initialize the bias of each filtering unit as 0.

According to a further aspect of the present invention, there is also provided a display device comprising any image compression system as stated above; and/or any image decompression system as stated above.

In the image compression system provided by some embodiments of the present invention, the update and predicting process is completed by the convolutional neural network modules, the corresponding image compression system can have an optimal compression rate by training the weight of each filtering unit in the convolutional neural network modules, which reduces the difficulties in setting filtering parameters of the image compression unit and image decompression unit.

BRIEF DESCRIPTION OF DRAWINGS

The features and advantages of some embodiments of the present invention can be understood more clearly with reference to the drawings, and the drawings are for illustration and should not be understood as any limitation to the present invention, wherein.

It should be appreciated that the drawings are only related to some embodiments of the present invention. As far as those ordinarily skilled in the art are concerned, other drawings can be obtained according to these drawings without making any inventive effort and are also within the scope of the present invention.

DETAILED DESCRIPTION

The present invention will be explained in detail with reference to the drawings and embodiments, such that those skilled in the art can better understand the object, features and advantages of some embodiments of the present invention. It needs to be explained that the embodiments and the features thereof in the present application can be combined if no conflicts are caused.

Many details are elaborated in the following description to facilitate solid understanding of the present invention. The present invention may, however, be carried out by other manners different from those described herein, so the scope of protection of the present invention is not subject to limitation by the embodiments disclosed as follows.

Figure 1:
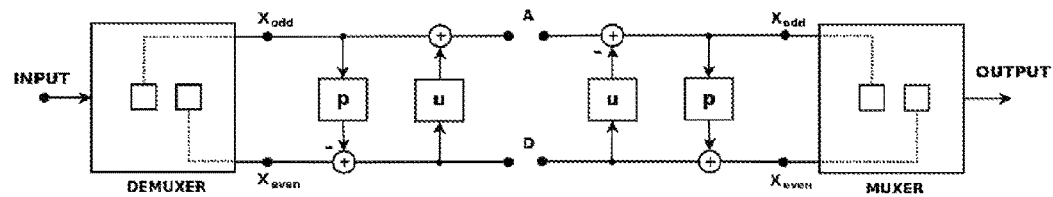
FIG. 1 is a structural schematic view of an image compression system.
Figure 2:
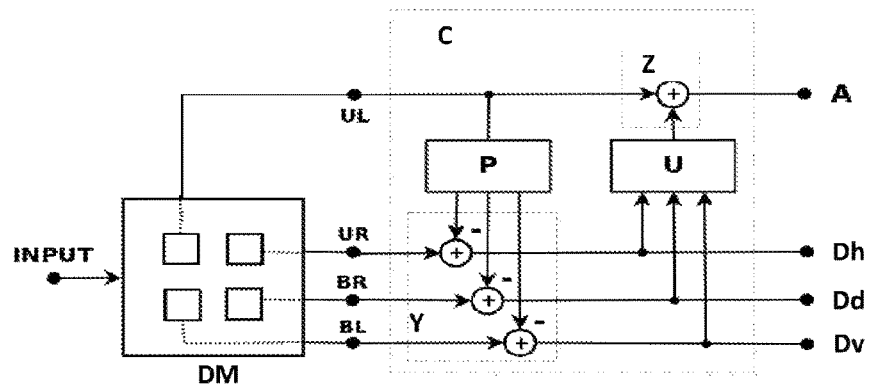
FIG. 2 is a structural schematic view of the image compression system according to an embodiment of the present invention.

FIG. 2 illustrates a structural schematic view of an image compression system according to an embodiment of the present invention. As shown in FIG. 2, the image compression system may comprise an image compression unit C. Optionally, the image compression system may further comprise an input interface INPUT, a splitting unit DM and an output interface.

The splitting unit DM is connected to the input interface INPUT so as to split each original image inputted to the input interface INPUT into four sub-images, such as a first sub-image UL, a second sub-image UR, a third sub-image BL and a fourth sub-image BR respectively. The splitting unit DM outputs the four sub-images to the image compression unit C for compression through a first output terminal to a fourth output terminal of the image compression unit C respectively. It shall be pointed out that the division of the original image into four sub-images is only an example. The original image may also be splitted into two sub-images, six sub-images, eight sub-images and nine sub-images, etc., which is not limited in the present invention. As shown in FIG. 2, the image compression unit C may comprise four input terminals, a first convolutional neural network module P, a discrepancy acquisition module Y, a second convolutional neural network module U, an image superposition module Z and four output terminals.

The first convolutional neural network module P is located between an output terminal of the splitting unit DM (or an input terminal of the image compression unit C) and the discrepancy acquisition module Y so as to receive a first sub-image UL, and predict a second sub-image, a third sub-image and a fourth sub-image respectively according to the first sub-image UL for obtaining a second predicted image to a fourth predicted image (hereinafter referred to as UR', BL' and BR') corresponding to the second sub-image to the fourth sub-image in a one-to-one relationship, and input the predicted images UR', BL' and BR' into the discrepancy acquisition module Y.

In addition to being connected to the first convolutional neural network module P to receive the predicted images UR', BL' and BR', the discrepancy acquisition module Y is also connected to the other three output terminals of the splitting unit DM (or the other three input terminals of the image compression unit C), the second convolutional neural network module U and the three output terminals thereof. After receiving the predicted images UR', BL' and BR' from the first convolutional neural network module P, the discrepancy acquisition module Y respectively determine the discrepant features between the predicted images UR', BL' and BR' and the sub-images (such as, the second sub-image to the fourth sub-image) corresponding to the predicted images so as to obtain a first discrepant feature Dh, a second discrepant feature Dd and a third discrepant feature Dv. The discrepancy acquisition module Y, on the one hand, outputs the first discrepant feature Dh, the second discrepant feature Dd and the third discrepant feature Dv to the output interface by the three output terminals of the image compression unit C so as to output the discrepant features as the discrepant feature set in the compressed image by the output interface, and, on the other hand, outputs the three discrepant features Dh, Dd and Dv to the second convolutional neural network module U.

The second convolutional neural network module U is connected with the image superposition module Z, and is configured to update the three received discrepant features Dh, Dd and Dv to obtain updated features corresponding to the three discrepant features Dh, Dd and Dv and output the updated features to the image superposition module Z.

The image superposition module Z is used to receive the first sub-image UL from the splitting unit DM and the updated features from the second convolutional neural network module U, and superpose the first sub-image UL with the updated features to obtain a corresponding superposed image A and output the same through another output terminal of the image compression unit. The another output terminal as shown is also connected to the output interface of the image compression system so as to output the superposed image as a part of the compressed image through the output interface.

Figure 3:
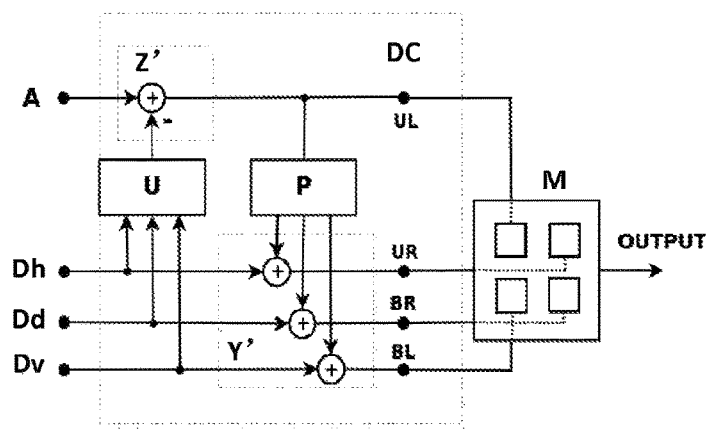
FIG. 3 is a structural schematic view of an image decompression system according to an embodiment of the present invention.

In correspondence to the image compression system as shown in FIG. 2, FIG. 3 illustrates an image decompression system according to an embodiment of the present invention for decompressing the compressed image obtained by the image compression system in FIG. 2 to obtain the original image. With reference to FIG. 3, the image decompression system may comprise an image decompression unit DC. Optionally, the image decompression system may also comprise an input interface, a slicing unit M and an output interface OUTPUT.

The image decompression unit DC comprises the second convolutional neural network module U, an image desuperposition module Z', the first convolutional neural network module P, a de-discrepancy module Y', four input terminals and four output terminals. The first input terminal is used to receive the superposed image, such as the superposed image A, contained in the compressed image to be decompressed. The superposed image A can be the superposed image A outputted by the image compression system as shown in FIG. 2.

A second input terminal to a fourth input terminal are used to respectively receive the discrepant features Dh, Dd and Dv contained in the discrepant feature set, the discrepant features Dh, Dd and Dv are respectively the difference between the second sub-image UR and the second predicted image UR', that between the third sub-image BR and the third predicted image BR' and that between the fourth sub-image BL and the fourth predicted image BL' (namely, the respective differences between the predicted images UR', BR' and BL' and the sub-images UR, BR and BL).

The second convolutional neural network module U is connected with the image desuperposition module Z' and the three discrepant feature input terminals, and is configured to update the discrepant features Dh, Dd and Dv received by the discrepant feature input terminal so as to obtain the corresponding updated features and output the updated features to the image desuperposition module Z'.

The image desuperposition module Z' is connected with the first convolutional neural network module P, an output terminal and the superposed image input terminal for receiving the superposed image. The image desuperposition module Z' desuperposes the updated features obtained by the second convolutional neural network module U from the superposed image A inputted into the superposed image input terminal to restore and output the first sub-image UL to the first convolutional neural network module P, and output the sub-image UL by the connected output terminal.

In a specific embodiment, the second convolutional neural network module U herein is identical with that in FIG. 2, so the updated features obtained by the second convolutional neural network module U in FIG. 3 are completely the same as those obtained by the second convolutional neural network module U in FIG. 2, and correspondingly the sub-image UL obtained by desuperposing the updated features from the superposed image A can be deemed to be completely identical with the original sub-image UL.

The first convolutional neural network module P is connected with the image de-discrepancy module Y', and is configured to predict the predicted images UR', BR' and BL' of the sub-images UR, BR and BL by utilizing the sub-image UL received from the image desuperposition module Z' and output the predication results to the de-discrepancy module Y'.

The de-discrepancy module Y' is connected with the input terminals for inputting the discrepant features and other three output terminals so as to obtain the images UR, BR and BL according to the discrepant features Dh, Dd and Dv in the discrepant feature set received by the discrepant feature input terminals and the predicted images UR', BR' and BL', and outputs the same by the other three output terminals.

Similarly, the first convolutional neural network module P herein is identical with that in FIG. 2, so the predicted sub-image UL' obtained by the first convolutional neural network module P in FIG. 3 is completely the same as the predicted sub-image UL' obtained by the first convolutional neural network module P in FIG. 2, and the images UR, BR and BL restored by the de-discrepancy module Y' can be deemed to be completely identical with the original images UR, BR and BL.

It can be easily understood that the step carried out by the desuperposition module Z' is a reverse process of the step carried out by the superposition module Z in FIG. 2, and the desuperposition module Z' in FIG. 3 will conduct a desuperposition process in a way reverse to the superposition process conducted by the superposition module Z in FIG. 2. Similarly, the de-discrepancy process conducted by the de-discrepancy module Y' herein can be deemed as a reverse process of the discrepancy acquisition process conducted by the discrepancy acquisition module Y. The slicing unit M is connected with each of the output terminals and with the output interface OUTPUT. Having received the restored sub-image UL and the images UR, BR and BL from the four output terminals, the slicing unit M slices the sub-images into a full image and output the same through the output interface OUTPUT.

It can be seen that as long as the filtering parameters of the first convolutional neural network module P and the second convolutional neural network module U in FIG. 3 are correspondingly the same as those of the first convolutional neural network module P and the second convolutional neural network module U in FIG. 2, the desuperposition process conducted by the desuperposition module Z' in FIG. 3 is completely reverse to the superposition process conducted by the superposition module Z in FIG. 2, and the de-discrepancy process conducted by the de-discrepancy module Y' in FIG. 3 is completely reverse to the discrepancy process conducted by the discrepancy acquisition module Y in FIG. 2, it is possible for the image decompression system in FIG. 3 to precisely restore the image compressed by the image compression system in FIG. 2, and the filtering parameters of the first convolutional neural network module P and the second convolutional neural network module U do not matter in this regard.

Since, in the above embodiment, it is the first convolutional neural network module P that conducts a corresponding predication process and the second convolutional neural network module U that conducts a corresponding update process, it is possible to enable the first convolutional neural network module P and the second convolutional neural network module U to have optimal filtering parameters by training the first convolutional neural network module P and the second convolutional neural network module U, thereby rendering the image compression unit a higher compression rate, and there is no need to manually set corresponding filtering parameters, which reduces the complexity in filtering parameter setting. Moreover, the image compression system provided by some embodiments of the present invention can, by way of appropriate training, make the output discrepant features Dh, Dd and Dv about 0, and the overall compression rate close to 75%.

Meanwhile, in some embodiments of the present invention, an image compression system is provided with a splitting unit and an image decompression system is provided with a slicing unit so as to compress an image. In actual application, however, the splitting unit and the slicing unit are not structures that must be disposed. In absence of a splitting unit and a slicing unit, four images (e.g., four consecutive image frames), for example, can be inputted to the corresponding image compression unit C so as to be compressed directly by the image compression unit C. The corresponding technical solution can realize some basic objects of the present invention and shall fall within the scope of protection of the present invention.

In such an embodiment, it is possible to train only the image compression system in FIG. 2 so as to obtain the filtering parameters of the first convolutional neural network module P and the second convolutional neural network module U, and set the image decompression system in FIG. 3 according to the obtained filtering parameters, in such a way to realize the corresponding decompression process.

It can be easily understood that although the embodiment as shown in FIGS. 2 and 3 is explained by using the sub-image UL on the upper left side to predict other sub-images UR, BR and BL (namely, by using the sub-image UL as the first image and images UR, BR and BL as the second images), it is possible in actual application to use the sub-images UR, BR or BL as the first image to predict other images. Additionally, although in the embodiment as shown in FIGS. 2 and 3, one first image is used to predict other images, it is also possible in actual application to use two images to predict two images or three images to predict three images in some alternative embodiments. The advantage of using more images to predict other images is to enhance the accuracy of prediction and reduce the differences between the discrepant features. Nevertheless, since the number of superposed images obtained is equal to the number of images in the first image, under the circumstances that there is only one image compression unit, the compression rate by using two images to predict two images can theoretically reach 50%, and the compression rate by using three images to predict one image can theoretically reach 25%. The theoretical maximum compression rate is still smaller in comparison with that of the embodiment as shown in FIGS. 2 and 3. These alternative embodiments, however, can be understood as simple variations of the above embodiments, and the corresponding technical solutions thereof shall fall within the scope of protection of the present invention. More generally speaking, in an embodiment, the splitting unit DM can split the original image into 2n sub-images, wherein n is a positive integer greater than 0, and the first convolutional neural network module P uses a sub-image to predict other 2n−1 sub-images. In such a case, the compression rate can maximally reach (2n−1)/2n in theory.

Figure 4:
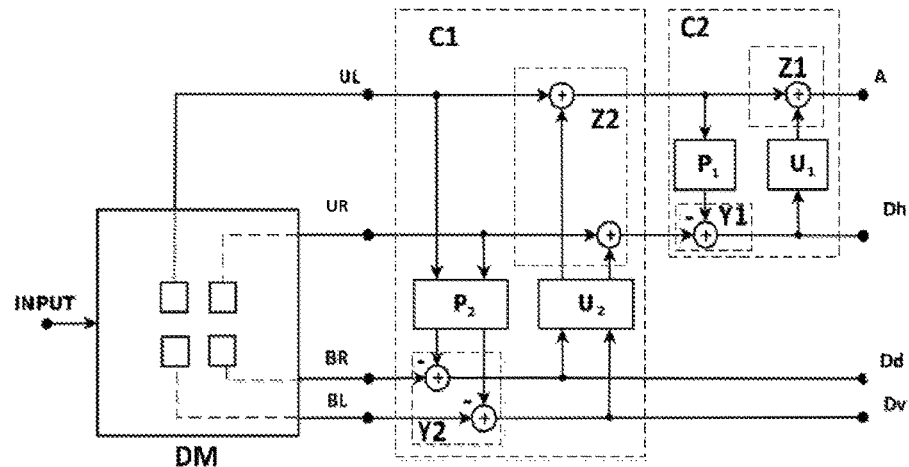
FIG. 4 is a structural schematic view of the image compression system according to another embodiment of the present invention.

FIG. 4 illustrates a structural schematic view of the image compression system according to an embodiment of the present invention. Unlike FIG. 2, the image compression system provided by the embodiment in FIG. 4 is a two-stage image compression system comprising two stages of image compression units C1 and C2. Each stage of the image compression unit comprises a first convolutional neural network module, a second convolutional neural network module, a discrepancy acquisition module and a superposition module. For the sake of differentiation, in FIG. 4, the first convolutional neural network module in the first stage image compression unit C1 is represented by P2, the second convolutional neural network module by U2, the discrepancy acquisition module by Y2 and the image superposition module by Z2. The first convolutional neural network module in the second stage image compression unit C2 is represented by P1, the second convolutional neural network module by U1, the discrepancy acquisition module by Y1 and the image superposition module by Z1.

Wherein the image superposition module Z2 of the first stage image compression unit C1 is connected to the input terminal of the second stage image compression unit C2 so as to output the generated superposed image to the input terminal of the second stage image compression unit C2. The second stage image compression unit C2 compresses the superposed image outputted by the image superposition module Z2 of the first stage image compression unit C1 as the image to be compressed. The image superposition module Z1 of the second stage image compression unit C2 is connected to one of the output terminals so as to output the superposed image A through the output terminal. The discrepancy acquisition module Y1 of the second stage image compression unit C2 is connected to the second output terminal for outputting the acquired discrepant feature Dh through the second output terminal. The discrepant feature acquisition module Y2 of the first stage image compression unit C1 is also connected to the third output terminal and the fourth output terminal for outputting the discrepant feature Dd through the third output terminal and the discrepant feature Dv through the fourth output terminal. In doing so, the output interface of the whole image compression system finally outputs the discrepant features outputted by each stage of the image compression unit and the superposed image outputted by the final stage image compression unit C2. Furthermore, different from the image compression unit C in FIG. 2, the first convolutional neural network module P2 in the first stage image compression unit C1 utilizes two images (the sub-image UL on the upper left side and the sub-image UR on the upper right side in the drawing) to predict the other two sub-images BR and BL so as to obtain the predicted images BR' and BL', and inputs the predicted images BR' and BL' into the discrepancy acquisition module Y1. The discrepancy acquisition module Y1 compares the predicted sub-image BR' with the actual sub-image BR to obtain the discrepant feature Dd, and compares the predicted sub-image BL' with the actual sub-image BL to obtain the discrepant feature Dv. Thereafter, the discrepancy acquisition module Y2 outputs the discrepant feature Dd and the discrepant feature Dv respectively to the second convolutional neural network module U2 of the image compression system C1 so that the second convolutional neural network module U2 can update the discrepant features Dd and DV and output the updated features to the superposition module Z2. The superposition module Z2 superposes the updated features respectively to the sub-images UL and UR to obtain two superposed images (respectively called a-UL and a-UR), which are outputted by the output terminals for outputting the superposed image to the input terminals of the second stage image compression unit C2.

The process during which the second stage image compression unit C2 compresses the superposed images a-UL and a-UR outputted by the first stage image compression unit C1 is identical with the compressing process of the image compression unit C in the embodiment as shown in FIGS. 2 and 3 and the image compression unit C2. The difference lies in that the second stage image compression unit C2 takes one image a-UL of the two superposed images outputted by the first stage image compression unit C1 as the first image to predict another image a-UR, and takes another image a-UR of the two superposed images outputted by the first stage image compression unit C1 as the second image so as compare it with the predicted image to obtain the discrepant features. The second stage image compression unit C2 finally outputs the superposed image A and the discrepant feature Dh.

At last, the image compression system outputs the superposed image A outputted by the second stage compression unit C2 and the discrepant features Dd, Dv and Dh outputted by the image compression units C1 and C2 at all stages through its own output interface (to be differentiated from the output terminal of the image compression unit at all stages, the output interface of the image compression system will be called an output unit).

Figure 5:
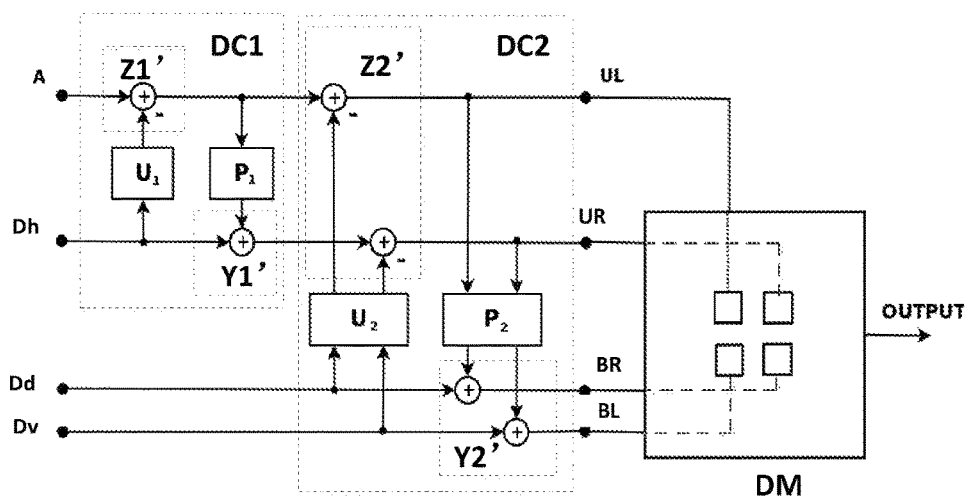
FIG. 5 is a structural schematic view of the image decompression system according to another embodiment of the present invention.

In correspondence to the image compression system of FIG. 4, FIG. 5 illustrates the image decompression system according to an embodiment of the present invention. Unlike the image decompression system in FIG. 3, the image decompression system in FIG. 5 comprises two stages of image decompression units DC1 and DC2. The configuration of each stage of the image decompression unit is substantially identical with that of the image decompression unit DC in the embodiment shown in FIG. 3, namely it comprises a first convolutional neural network module, a second convolutional neural network module, an image desuperposition module and a de-discrepancy module. For the sake of differentiation, in FIG. 5, the first convolutional neural network module in the first stage image decompression unit DC1 is represented by P1, the second convolutional neural network module by U1, the image desuperposition module by Z1' and the de-discrepancy module by Y1'. The first convolutional neural network module in the second stage image decompression unit DC2 is represented by P2, the second convolutional neural network module by U2, the image desuperposition module by Z2' and the de-discrepancy module by Y2'. It can be easily understood that in order to decompress the compressed image obtained by the image compression system in FIG. 4, similar reference numerals in FIGS. 4 and 5 indicate alike modules. The first convolutional neural network module P1 in the first stage image decompression unit DC1 in FIG. 5 shall be the same as the first convolutional neural network module P1 in the second stage image compression unit C2 in FIG. 4. The processes conducted by two modules Q and Q' shall be mutually reversible, for example, the de-discrepancy process conducted by the de-discrepancy module Y2' of the second stage image decompression unit DC2 and the discrepant feature acquisition process conducted by the discrepancy acquisition module Y2 of the first stage image compression unit C1 in FIG. 4 are mutually reversible, which will not be explained in detail.

The image decompression units provided by the embodiment shown in FIG. 5 are different from the image decompression unit in FIG. 3. The first stage image decompression unit DC1 utilizes one superposed image A and the discrepant feature Dh to restore an image and output the same through the output terminal to the superposed image input terminal of the second stage image decompression unit DC2. The second stage image decompression unit DC2 utilizes the restored images a-UL and a-UR outputted by the first stage image decompression unit DC1 as the superposed images to be decompressed and finally obtain four restored sub-images UL, UR, BL and BR respectively according to the discrepant features Dd and Dv.

The slicing unit M is connected with the output terminal of the final stage image decompression unit DC2 so as to slice the restored images outputted by the final stage image decompression unit DC2 into a complete image.

The manner provided by the embodiment as shown in FIGS. 4 and 5 can also achieve the basic objects of some embodiments of the present invention. Please refer to the explanation with reference to FIGS. 2 and 3 for the basic principle and no more details will be reiterated. Meanwhile, in the embodiment as shown in FIGS. 4 and 5, during the first stage compression, two images are utilized to predict the other two images respectively in such a way to render the corresponding predication process more accurate and the obtained discrepant features smaller. By means of the second stage compression, the system is enabled to finally output only one superposed image. When the discrepant features are approaching 0, the entire compression rate can still be close to 75%. Similarly, the decompression process of the image decompression unit is totally contrary to the compression process of the image compression unit, such that the image decompression unit can accurately restore the corresponding image.

It can be easily understood that although a two-stage image compression unit (namely, the number of image compression units is 2) is used as an example for explanation in FIGS. 4 and 5, multi-stage image compression unit can also be used in some alternative embodiments in actual application. For example, the number of the image compression units may be 3, the number of the corresponding first images of the first stage image compression unit may be 3, the number of the corresponding first images of the second stage image compression unit may be 2, the number of the corresponding first image of the third image compression unit may be 1, and finally one can still obtain a superposed image and three discrepant features. Correspondingly, the number of the image decompression units in the corresponding image decompression system is not limited to two stages, and the specific configuration of the image decompression system corresponds to that of the image compression system.

In actual application, the first image is not limited to sub-images UL and UR in some alternative embodiments, and may be a combination of any two images. It can be easily understood that although in the first stage image compression unit C1 of the embodiment shown in FIG. 4, there are two images used as the first images and two images used as the second images, it shall be known that in actual application, three images can be used as the first images and one image can be used as the second image in some alternative embodiments.

It can be easily understood that although all the above embodiments are explained by the example in which the splitting unit DM splits an image into four images, it is also possible in actual application that the splitting unit DM splits the image into different number of images, such as two images, six images, eight images or nine images, in some alternative embodiments. The number of the corresponding first image and second image is not limited to the number indicated in the above embodiments. In an embodiment, the splitting unit DM can split an image into 2n sub-images, wherein n is a positive integer greater than 1. The splitting unit DM provides the 2n sub-images to the first stage image compression unit C1, wherein n sub-images are used as the first image, and n sub-images are used as the second image.

Moreover, it can be easily understood that although the above embodiment is explained by an example in which the predication process goes before the update process in the course of compression, it is also possible in the actual application to conduct the update process before the predication process. The following is an explanation to the operational process of the embodiment obtained by swapping the order of the first convolutional neural network module P for conducting the predication process and the second convolutional neural network module U for conducting the update process in the embodiment shown in FIG. 2.

As such, for each image compression unit, the input terminal is connected to the second convolutional neural network module U which updates the second image (images UR, BR and BL) of the images inputted to into the input terminal so as to obtain the updated features that are to be inputted into the image superposition module Z; the image superposition module Z is connected with the first convolutional neural network module P and the superposed image output terminal so as to superpose the updated features with the image (sub-image UL) of the first images to obtain the superposed image A and then output the superposed image A through the superposed image output terminal. The image superposition module Z also outputs the superposed image A to the first convolutional neural network module P, and the first convolutional neural network module P predicts the second image according to the superposed image A to obtain predicted images (images UR', BR' and BL') and outputs the same to the discrepancy acquisition module Y. The discrepancy acquisition module Y acquires the differences between the predicted images and the corresponding actual images (images UR, BR and BL) to obtain the discrepant features (Dh, Dd and Dv) and outputs the same through the discrepant feature output terminal. In a corresponding image decompression system, the first convolutional neural network module P is connected with the superposed image input terminal and the image de-discrepancy module Y' so as to predict the predicted images UR', BR' and BL' of the second images UR, BR and BL according to the superposed image A inputted through the superposed image input terminal and output the predicted images to the image de-discrepancy module Y'. The image de-discrepancy module Y' is connected with the second convolutional neural network module U, the output terminal and the discrepant feature input terminal so as to restore the images (UR, BR and BL) of the second images according to the predicted images of the second images and the discrepant feature set (Dh, Dd and Dv) received by the discrepant feature input terminal, and output the restored images to the second convolutional neural network module U and to three output terminals of the image decompression unit DC.

The second convolutional neural network module U is connected with the image desuperposition module Z', and is configured to update the restored images UR, BR and BL to obtain the corresponding updated features and output the updated features to the image desuperposition module Z'.

The image desuperposition module Z' is connected with another output terminal, and is configured to desuperpose the superposed image A according to the updated features to obtain the restored image (UL) of the first image and output the same through the another output terminal.

Finally, the slicing unit M slices the four sub-images (UL, UR, BR and BL) outputted by the image decompression unit into one image and output the same through the output interface OUTPUT.

As for the structures of the image compression system and the image decompression system provided by the embodiment shown in FIGS. 4 and 5, reference can be made to the corresponding structures of the image compression system and the image decompression system as stated above, and no details will be reiterated herein.

Such implementation can likewise achieve the basis objects of some embodiments of the present invention and correspondingly fall within the scope of protection of the present invention. It can be easily understood that one can swap the order of the first convolutional neural network module P and the second convolutional neural network module U in each image compression unit of the embodiment shown in FIG. 4, and accordingly the order of the second convolutional neural network module U and the first convolutional neural network module P in each image decompression unit shown in FIG. 5, or only swap the order of the first convolutional neural network module P and the second convolutional neural network module U in one image compression unit of the image compression system, and the order of the first convolutional neural network module P and the second convolutional neural network module U in the corresponding one image decompression unit of the image decompression system. As for the specific operational process of the technical solution, reference can be made to the operational process of the embodiment shown in FIGS. 4 and 5 and the operational process of the embodiment obtained by swapping the order of the first convolutional neural network module P and the second convolutional neural network module U of the embodiment shown in FIGS. 2 and 3. No details will be reiterated herein.

Update and predication processes referred to in the present invention is are identical with those mentioned in the lifting scheme for wavelet transform.

According to a further aspect of the present invention, the disclosure also provides a training method for training any image compression system as stated above, which comprises the steps of:

inputting a pre-set image as an image to be compressed into an image compression system, and adjusting the weight of each filtering unit in each convolutional layer of a first convolutional neural network module and a second convolutional neural network module until the value of the cost function L is the minimum:

$$L = \sum_{m=1}^{M} \|Dm\|_p + \|A - LR\|_q$$

wherein Dm is the m-th discrepant feature in a discrepant feature set, M is the number of the discrepant features in the discrepant feature set; A is a superposed image finally outputted from the image compression system; LR is a low-resolution image corresponding to the pre-set image; and p and q are natural numbers; wherein $$\|X\|_1 = \sqrt{\sum_{n=0}^{N} x(n)}; \|X\|_2 = \sqrt{\sum_{n=0}^{N} x^2(n)};$$

x(n) is the n-th element in X, and N is the total number of the elements in X.

In doing so, it is possible to obtain a more accurate weight of each filtering unit and a better compression rate of the image compression system.

In most cases, p and q in the L1 norm is 1, and p and q in the L2 norm is 2, wherein the L2 norm is more stable than the L1 norm, but the L1 norm can increase the sparsity. Sparsity (a large number of exactly zero values) is desired in the discrepant feature images. In an embodiment, the value of p and q shall be selected according to a combine strategy that p=1 and p=2.

Furthermore, in specific implementation, the filtering parameter of the filtering unit in any layer of the multi-resolution system having a plurality of layers (suppose there are O layers) can be set according to the following formula, such that the cost function of the O layers is the minimum:

$$L = \sum_{m=1}^{M} \|Dm\|_p + \|A^O - LR\|_q.$$

Thus, the parameters of each level can be independent. In one circumstance, the total parameters are increased in number and are adjusted in terms of the discrepant features, or are re-used; and in another circumstance, the total parameters are reduced in number and tuned in terms of multiple levels. The configuration of the re-used parameters at each level corresponds to a Recursive Neural Network (RNN).

To be specific, LR herein refers to a low-resolution image obtained by the Bicubic manner or other standard downscaling methods.

Furthermore, before the step of inputting a pre-set image as an image to be compressed into an image compression system, and adjusting the weight of each filtering unit in each convolutional layer of a first convolutional neural network module and a second convolutional neural network module until the value of the cost function L is the minimum, the method may further comprises the step of initializing the weight of each filtering unit in each convolution layer. An appropriate initial parameter setting can shorten the period of time required for training and reduce the difficulty in training. The present disclosure provides two initializing manners:

Manner 1: initializing the weight of each filtering unit of the first convolutional neural network module according to the following formula:

$$W_{ij} = \begin{cases} \frac{1}{(NF)}; & \text{if } (i, j) \text{ is a preset anchor pixel} \\ 0; & \text{otherwise} \end{cases},$$

wherein NF indicates the number of input features;

Manner 2: initializing the weight of each filtering unit of the first convolutional neural network module according to the following formula:

$$W_{ij} = \frac{1}{NF \cdot W \cdot H}$$

wherein $W_{ij}$ is the weight corresponding to the filter whose input unit is the i-th input unit and whose output unit is the j-th output unit; NF is the number of input features, W is the height of the corresponding filtering unit, and H is the width of the corresponding filtering unit.

Moreover, after the weight $W_{ij}$ of each filtering unit is obtained through initialization, an interference value $$\frac{\text{uniform}(-1, 1)}{\sqrt{NF}}$$

is superposed with the weight of each filtering unit of the first convolutional neural network module in the initialization system, wherein uniform (−1,1) indicates a random number selected between (−1, 1); and the bias of each filtering unit is initialized as 0.

According to another aspect of the present invention, there is provided a device for training any image compression system as stated above. The training device can be used to carry out the above-mentioned training method. The training device comprises:

an adjusting module for inputting a pre-set image as an image to be compressed into an image compression system, and adjusting the weight of each filtering unit in each convolutional layer of a first convolutional neural network module and a second convolutional neural network module to make the value of the following cost function L minimum:

$$L = \sum_{m=1}^{M} \|Dm\|_p + \|A - LR\|_q$$

wherein Dm is the m-th discrepant feature in a discrepant feature set, M is the number of the discrepant features in the discrepant feature set, for example, when the image compression system shown in FIG. 2 is trained, Dm herein may refer to Dh, Dd and Dv respectively; A is a superposed image finally outputted from the image compression system; LR is a low-resolution image corresponding to the pre-set image; and p and q are natural numbers; wherein $$\|X\|_1 = \sqrt{\sum_{n=0}^{N} x(n)} \, ; \|X\|_2 = \sqrt{\sum_{n=0}^{N} x^2(n)} \, ;$$

x(n) is the n-th element in X, and N is the total number of the elements in X.

Moreover, the training device further comprises: a first initialization module or a second initialization module.

The first initialization module is configured to initialize the weight of each filtering unit of a first convolutional neural network module according to the following formula before the adjusting module adjusts the weight of each filtering unit in each convolutional layer of the first convolutional neural network module:

$$W_{ij} = \begin{cases} 1/(NF); & \text{if } (i, j) \text{ is a preset anchor pixel} \\ 0; & \text{otherwise} \end{cases},$$

wherein NF indicates the number of input features.

The second initialization module is configured to initialize the weight of each filtering unit of the first convolutional neural network module according to the following formula before the adjusting module adjusts the weight of each filtering unit in each convolutional layer of the first convolutional neural network module:

$$W_{ij} = \frac{1}{NF \cdot W \cdot H}$$

wherein $W_{ij}$ is the weight corresponding to the filter whose input unit is the i-th input unit and whose output unit is the j-th output unit; NF is the number of input features, W is the height of the corresponding filtering unit, and H is the width of the corresponding filtering unit.

In addition, the training device further comprises a third initialization module that is configured to superpose an interference value $$\frac{\text{uniform}(-1, 1)}{\sqrt{NF}}$$

with the weight of each filtering unit of the first convolutional neural network module in the initialization system before the adjusting module adjusts the weight of each filtering unit in each convolutional layer of the first convolutional neural network module, wherein uniform (−1,1) indicates a random number selected between (−1, 1); and the bias of each filtering unit is initialized as 0.

According to a yet aspect of the present invention, there is also provided a display device comprising any image compression system and/or image decompression system as stated above.

In specific implementation, the display device herein may be any product or component having a display function, such as electronic paper, mobile phones, tablets, TVs, displays, laptops, digital picture frames, navigators.

Although the embodiments of the present invention are described with reference to the drawings, it is appreciated that the above embodiments are only exemplary embodiments of the present invention, and the present invention should not be limited thereto. As far as those skilled in the art are concerned, various variations and modifications can be made without departing from the spirit and technical principles of the present invention and shall fall within the protection scope of the present invention. The protection scope of the present invention depends on the protection scope of the appended claims.

What needs to be explained is that the above embodiments are only illustrated by way of the above individual functional modules division. In actual application, the above functions can be allocated to different functional modules as desired. The internal structure of the device can be divided into different functional modules so as to accomplish all or part of the functions as stated above. In addition, function(s) of the above one module can be achieved by a plurality of modules, and functions of the above plurality of modules can be integrated into one module.

The term "and/or" used herein is only used to describe the connecting relations between objects connected thereby, which may be of three types. For instance, "A and/or B" can represent the following three situations: either A alone, or B alone, or both A and B. In addition, the character "/" used herein generally indicates that the former and the latter objects connected thereby is in a "or" relationship.

The wordings, such as "first", "second" and "third", are used in the present application. Unless specified in the context, such wordings do not imply an order, but are actually used for the purpose of identification. For instance, the phrases "a first image" and "a second image" do not necessarily mean the first image is located in front of the second image, or the first image is generated, received or processed prior to the second image in terms of time. In fact, these phrases are only used to identify different images.

In the claims, any reference numeral in parentheses should not be interpreted as a limitation to the claims. The term "comprise/include" does not exclude the presence of elements or steps other than those listed in the claims. The present invention may be achieved by means of hardware comprising several separate elements, or by properly programmed software or firmware, or by any combination thereof.

In device or system claims that enumerate several means, one or more of the means can be embodied by one and the same item of hardware. The mere fact that some measures are recited in different dependent claims does not indicate that the combination of the measures cannot be used to advantage.

The invention claimed is:

1. A method for training an image compression system, wherein the image compression system comprises:
   a first image input terminal for receiving a first image and a plurality of second image input terminals for receiving a plurality of second images;
   a first convolutional neural network module configured to respectively predict each of the second images to obtain a plurality of predicted images corresponding to the plurality of second images in a one-to-one relationship;
   an image discrepancy acquisition module configured to determine the discrepant features between each of the second images and the corresponding predicted image, and take the discrepant features as a discrepant feature set;

a second convolutional neural network module configured to determine updated features corresponding to the first images in a one-to-one relationship;

an image superposition module configured to superpose the updated feature with the corresponding first image to obtain a superposed image; and an output terminal configured to output the superposed image obtained by the image superposition module and the discrepant feature set determined by the image discrepancy acquisition module as a compressed image;

wherein the first convolutional neural network module is configured to predict each of the second images respectively according to the first image so as to obtain the plurality of predicted images corresponding to the plurality of second images in a one-to-one relationship, and the second convolutional neural network module updates the discrepant feature set to obtain the updated features; or the second convolutional neural network module updates the plurality of second images to obtain the updated features, and the first convolutional neural network module is configured to predict the plurality of second images respectively according to the superposed image so as to obtain the plurality of predicted images corresponding to the plurality of second images in a one-to-one relationship, wherein the method comprises the steps of:

inputting a pre-set image as an image to be compressed into the image compression system, and respectively adjusting the weight of each filtering unit in each convolutional layer of a first convolutional neural network module and a second convolutional neural network module until the value of the following cost function L is the minimum:

$$L = \sum_{m=1}^{M} \|Dm\|_p + \|A - LR\|_q$$

wherein Dm is the m-th discrepant feature in a discrepant feature set, M is the number of the discrepant features in the discrepant feature set; A is a superposed image finally outputted from the image compression system; LR is a low-resolution image corresponding to the pre-set image; and p and q are natural numbers; wherein $$\|X\|_1 = \sqrt{\sum_{n=0}^{N} x(n)} \; ; \|X\|_2 = \sqrt{\sum_{n=0}^{N} x^2(n)} \; ;$$

x(n) is the n-th element in X, and N is the total number of the elements in X.

2. The method according to claim 1, wherein before the step of adjusting the weight of each filtering unit in each convolutional layer of a first convolutional neural network module, the method further comprises the step of:

initializing the weight of each filtering unit of the first convolutional neural network module according to the following formula:

$$W_{ij} = \begin{cases} 1/(NF); & \text{if } (i, j) \text{ is a preset anchor pixel} \\ 0; & \text{otherwise} \end{cases},$$

wherein NF indicates the number of input features;

or initializing the weight of each filtering unit of the first convolutional neural network module according to the following formula:

$$W_{ij} = \frac{1}{NF \cdot W \cdot H}$$

wherein $W_{ij}$ is the weight corresponding to the filter whose input unit is the i-th input unit and whose output unit is the j-th output unit; NF is the number of input features, W is the height of the corresponding filtering unit, and H is the width of the corresponding filtering unit.

3. The method according to claim 2, wherein before the step of adjusting the weight of each filtering unit in each convolutional layer of a first convolutional neural network module, the method further comprises the step of:

superposing an interference value $$\frac{\text{uniform}(-1, 1)}{\sqrt{NF}}$$

with the weight of each filtering unit of the first convolutional neural network module in the initialization system, wherein uniform (−1,1) indicates a random number selected between (−1, 1);

initializing the bias of each filtering unit to be 0.

4. A device for training an image compression system, wherein the image compression system comprises:

a first image input terminal for receiving a first image and a plurality of second image input terminals for receiving a plurality of second images;

a first convolutional neural network module configured to respectively predict each of the second images to obtain a plurality of predicted images corresponding to the plurality of second images in a one-to-one relationship;

an image discrepancy acquisition module configured to determine the discrepant features between each of the second images and the corresponding predicted image, and take the discrepant features as a discrepant feature set;

a second convolutional neural network module configured to determine updated features corresponding to the first images in a one-to-one relationship;

an image superposition module configured to superpose the updated feature with the corresponding first image to obtain a superposed image; and an output terminal configured to output the superposed image obtained by the image superposition module and the discrepant feature set determined by the image discrepancy acquisition module as a compressed image;

wherein the first convolutional neural network module is configured to predict each of the second images respectively according to the first image so as to obtain the plurality of predicted images corresponding to the plurality of second images in a one-to-one relationship, and the second convolutional neural network module updates the discrepant feature set to obtain the updated features; or the second convolutional neural network module updates the plurality of second images to obtain the updated features, and the first convolutional neural network module is configured to predict the plurality of second images respectively according to the superposed image so as to obtain the plurality of predicted images corresponding to the plurality of second images in a one-to-one relationship, wherein the device comprises:

an adjusting module for inputting a pre-set image as an image to be compressed into the image compression system, and adjusting the weight of each filtering unit in each convolutional layer of a first convolutional neural network module and a second convolutional neural network module to make the value of the following cost function L minimum:

$$L = \sum_{m=1}^{M} \|Dm\|_p + \|A - LR\|_q$$

wherein Dm is the m-th discrepant feature in a discrepant feature set, M is the number of the discrepant features in the discrepant feature set; A is a superposed image finally outputted from the image compression system; LR is a low-resolution image corresponding to the pre-set image; and p and q are natural numbers;

wherein $$\|X\|_1 = \sqrt{\sum_{n=0}^{N} x(n)}\,; \|X\|_2 = \sqrt{\sum_{n=0}^{N} x^2(n)}\,;$$

x(n) is the n-th element in X, and N is the total number of the elements in X.

5. The device according to claim 4, further comprising a first initialization module or a second initialization module;

the first initialization module is configured to initialize the weight of each filtering unit of a first convolutional neural network module according to the following formula before the adjusting module adjusts the weight of each filtering unit in each convolutional layer of the first convolutional neural network module:

$$W_{ij} = \left\{ \begin{array}{ll} 1/(NF); & \text{if } (i, j) \text{ is a preset anchor pixel} \\ 0; & \text{otherwise} \end{array} \right.,$$

wherein NF indicates the number of input features;

the second initialization module is configured to initialize the weight of each filtering unit of the first convolutional neural network module according to the following formula before the adjusting module adjusts the weight of each filtering unit in each convolutional layer of the first convolutional neural network module:

$$W_{ij} = \frac{1}{NF \cdot W \cdot H}$$

wherein $W_{ij}$ is the weight corresponding to the filter whose input unit is the i-th input unit and whose output unit is the j-th output unit; NF is the number of input features, W is the height of the corresponding filtering unit, and H is the width of the corresponding filtering unit.

6. The device according to claim 5, further comprising a third initialization module that is configured to superpose an interference value $$\frac{\text{uniform}(-1, 1)}{\sqrt{NF}}$$

with the weight of each filtering unit of the first convolutional neural network module in the initialization system before the adjusting module adjusts the weight of each filtering unit in each convolutional layer of the first convolutional neural network module, wherein uniform (−1,1) indicates a random number selected between (−1, 1);

initialize the bias of each filtering unit as 0.

* * * * *